(12) United States Patent
Burkard et al.

(10) Patent No.: US 8,943,072 B2
(45) Date of Patent: Jan. 27, 2015

(54) DETERMINING OEM OF REBRANDED DEVICE

(71) Applicant: Xerox Corporation, Norwalk, CT (US)

(72) Inventors: Michael C. Burkard, Canandaigua, NY (US); Lawrence W. Meyer, Fairport, NY (US); Vijay Y. Kumar, Pittsford, NY (US); Andrew D. Hinkhouse, Rochester, NY (US); Walter Igharas, Webster, NY (US); Eric A. Strong, Rochester, NY (US); Juan T. Golphin, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 140 days.

(21) Appl. No.: 13/660,214

(22) Filed: Oct. 25, 2012

(65) Prior Publication Data

US 2014/0122500 A1    May 1, 2014

(51) Int. Cl.
  *G06F 17/30*    (2006.01)
(52) U.S. Cl.
  USPC .......................................................... 707/748
(58) Field of Classification Search
  CPC ................. G06F 17/3053; G06F 17/30985
  USPC .......................................................... 707/748
  See application file for complete search history.

(56) References Cited

U.S. PATENT DOCUMENTS

| | | | |
|---|---|---|---|
| 5,903,894 A | 5/1999 | Reneris | |
| 6,032,004 A | 2/2000 | Mirabella, Jr. et al. | |
| 6,721,817 B1 | 4/2004 | Khosrowpour | |
| 7,028,175 B2 | 4/2006 | Morrison et al. | |
| 7,149,887 B2 | 12/2006 | Morrison et al. | |
| 7,664,886 B2 | 2/2010 | Motoyama et al. | |
| 7,822,836 B1 | 10/2010 | Saparoff | |
| 7,874,664 B2 | 1/2011 | Gervasi et al. | |
| 2005/0053006 A1* | 3/2005 | Hongal et al. | 370/236.2 |
| 2008/0059623 A1* | 3/2008 | Yang et al. | 709/223 |
| 2008/0222732 A1 | 9/2008 | Caldwell et al. | |
| 2009/0248849 A1* | 10/2009 | Ishimoto | 709/223 |
| 2013/0031350 A1* | 1/2013 | Thielen et al. | 713/100 |

OTHER PUBLICATIONS http://en.wikipedia.org/wiki/MAC_address, pp. 1-4, Sep. 27, 2012.
http://tools.ietf.org/html/rfc1514, pp. 1-34, Sep. 1993.
http://tools.ietf.org/html/rfc1907, pp. 1-21, Jan. 1996.
http://www.coffer.com/mac_find/, p. 1, Feb. 2010.
http://oreilly.com/catalog/esnmp/chapter/ch02.html, pp. 1-27, Jul. 2001.

* cited by examiner

*Primary Examiner* — Apu Mofiz
*Assistant Examiner* — Cindy Nguyen
(74) *Attorney, Agent, or Firm* — Gibb & Riley, LLC (57) ABSTRACT

Methods and systems obtain manufacturer data from a device being evaluated. The manufacturer data includes a system description, a system object identification, and a device-type description. The system description includes a serial number having a format. The system object identification includes a standards manufacturer field established by a standards organization. The methods/systems evaluate the standards manufacturer field to identify the manufacturer, and rank multiple system object identifications based on the quantity of data within each system object identification. Additionally, the methods/systems match the format of the serial number to known manufacturer serial number formats. The foregoing allows the methods/systems to determine the original equipment manufacturer (OEM) of the evaluated device based on the manufacturer appearing in the data string, the rank for each system object identification, and the manufacturer appearing in the serial number format match.

24 Claims, 6 Drawing Sheets

DETERMINING OEM OF REBRANDED DEVICE

BACKGROUND

Embodiments herein generally relate to identifying devices, and more particularly to methods and systems for determining the original equipment manufacturer of a rebranded device.

Most network management tools use the Simple Network Management Protocol (SNMP) to manage devices. Original Equipment Manufacturers (OEM) sometimes sell their devices to other companies who rebrand the device, often with very limited internal changes to the device. These devices continue to provide richer or extended information under the OEM private SNMP arc. SNMP standards provide fields for storing information to identify a network device. But these are the standard fields often only indicate the "brand" manufacturer who rebrand the device, and do not indicate the OEM manufacturer.

Some network printers report that they are from one manufacturer (the brand manufacturer) but they are in fact rebranded devices from a separate second manufacturer, the OEM. These types of devices are difficult to manage using the brand manufacturer's programmatic interface, because it is often missing or limited, and does not provide the quality of interface that would be provided by the OEM's programmatic interface.

SUMMARY

An exemplary method herein obtains manufacturer data from a device being evaluated. The manufacturer data includes a system description, a system object identification, and a device-type description. The system description includes a serial number having a format. The system object identification includes a standards manufacturer field (for SMI enterprise codes, for example) established by a standards organization. Further, the method filters a list of manufacturers established by the standards organization to produce a filtered manufacturer list containing only those manufacturers matching the device-type description.

The method also evaluates the standards manufacturer field to identify the presence and validity of a data string by comparing the data string in the standards manufacturer field with the filtered manufacturer list. The method further ranks multiple system object identifications based on the quantity of data within each system object identification (manufacturer arc) to produce a rank for each system object identification. Additionally, the method matches the format of the serial number to known manufacturer serial number formats to produce a manufacturer serial number format match. The foregoing allows the method to determine the original equipment manufacturer (OEM) of the evaluated device based on the manufacturer appearing in the data string, the rank for each system object identification, and the manufacturer appearing in the serial number format match.

An additional method herein similarly obtains, using a communications device, manufacturer data from an evaluated device by, for example, dynamically querying the evaluated device via a simple network management protocol (SNMP). There may be multiple manufacturer data items indicating different manufacturers (only one of which can be the original equipment manufacturer) especially if the seller has obtained the evaluated device from another manufacturer, and has rebranded the evaluated device.

Again, the manufacturer data comprises many data items, including a system description, a system object identification, a device-type description, hypertext markup language (HTML) information, and a media access control (MAC) address having an organizationally unique identifier (OUI), etc. The system description includes a serial number having a format, and the system object identification includes a standards manufacturer field established by a standards organization.

This method filters a list of manufacturers established by the standards organization to produce a filtered manufacturer list containing only those manufacturers matching the device-type description using a processor operatively connected to the communications device. Such a method also evaluates the standards manufacturer field to identify the presence of a data string, and the validity of any such data string by comparing the data string in the standards manufacturer field with the filtered manufacturer list (again using the processor). In one example, the standards manufacturer field can comprise Internet assigned numbers authority (IANA) enterprise numbers.

This method then ranks multiple system object identifications that may appear in the manufacturer data based on the quantity of data within each system object identification to produce a rank for each system object identification (using the processor). The quantity of data within each system object identification is based only on the manufacturer portion (arc) of the system object identification, where the manufacturer portion of the system object identification is uniquely associated with (developed or owned by) only one of a plurality of different manufacturers.

Further, this method matches the format of the serial number to known manufacturer serial number formats to produce a manufacturer serial number format match, matches the OUI of the MAC address to known manufacturer OUI's to produce a manufacturer OUI match, and evaluates the HTML information to discover HTML manufacturer information (using the processor). Thus, this method can then determine the OEM of the evaluated device based on the presence of the data string, the validity of the data string, the rank for each system object identification, the manufacturer appearing in the serial number format match, the manufacturer appearing in the manufacturer OUI match, and the manufacturer appearing in the HTML manufacturer information.

A computerized device embodiment herein comprises a processor, a non-transitory storage medium operatively connected (directly or indirectly connected) to the processor, and a communications device operatively connected to the processor. The communications device obtains manufacturer data from the evaluated device. Again, the manufacturer data can include a system description, a system object identification, and a device-type description. The system description similarly includes a serial number having a format, and the system object identification includes a standards manufacturer field established by a standards organization.

The processor filters a list of manufacturers established by the standards organization stored in the non-transitory storage medium to produce a filtered manufacturer list containing only those manufacturers matching the device-type description. The processor evaluates the standards manufacturer field to determine the presence and validity of a data string by comparing the data string in the standards manufacturer field with the filtered manufacturer list.

The processor also ranks multiple system object identifications based on the quantity of data within each system object identification to produce a rank for each system object identification. The processor matches the format of the serial number to known manufacturer serial number formats stored in the non-transitory storage medium to produce a manufacturer serial number format match. Thus, the processor determines the original equipment manufacturer (OEM) of the evaluated device based on the manufacturer appearing in the data string, the rank for each system object identification, and the manufacturer appearing in the serial number format match.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

As mentioned above, rebranded devices (devices manufactured by a first manufacturer that are sold under a different manufacturer's brand name) are difficult to manage using the brand manufacturer's programmatic interface, because the brand manufacturer's programmatic interface is often missing or limited, and does not provide the quality of interface that would be provided by the OEM's programmatic interface. Therefore, the systems and methods herein programmatically determine the original equipment manufacturer (OEM) of a device to provide better management of the device. Once the OEM is determined, extended data can be retrieved from the device as compared to the branded manufacturer's limited store of data or the industry standard store of data.

Figure 1:
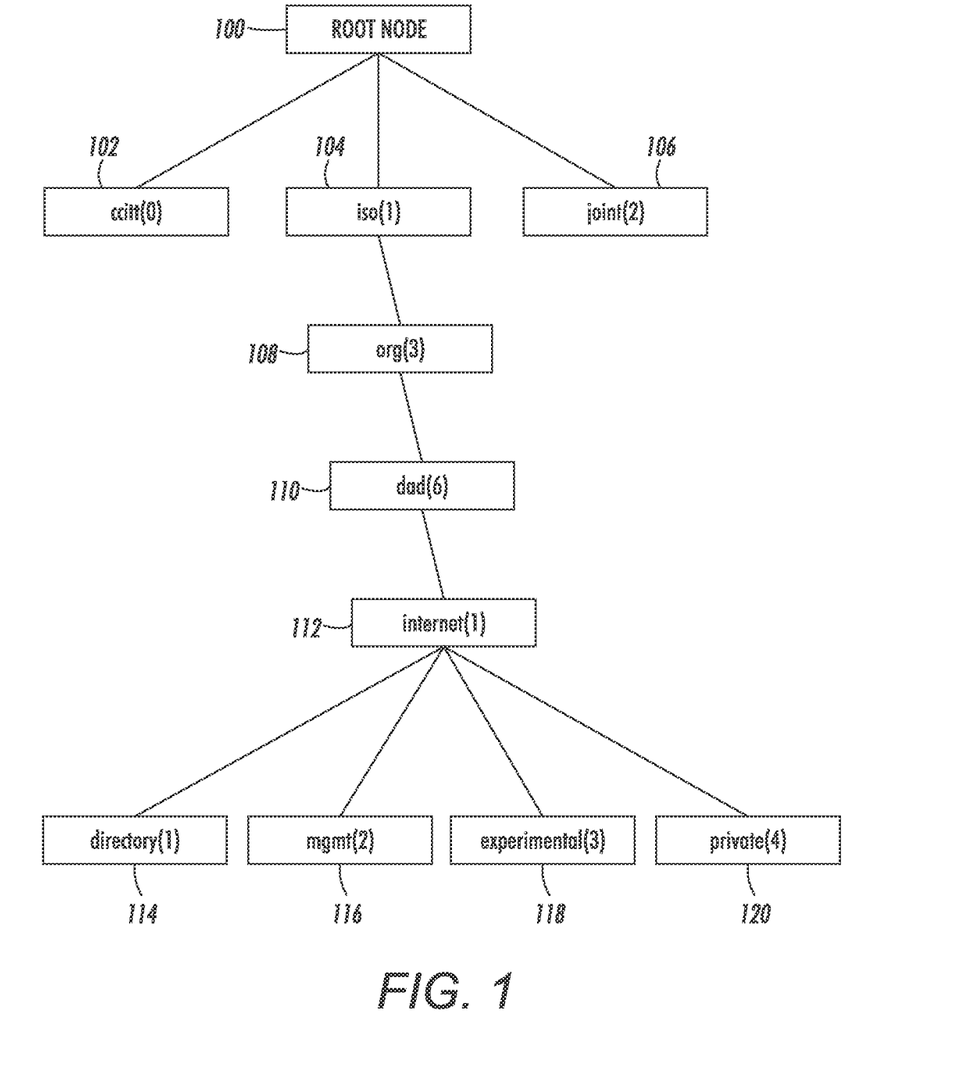
FIG. 1 is a schematic diagram illustrating a simple network management protocol (SNMP) hierarchical tree of data.

As mentioned above, a protocol named the Simple Network Management Protocol (SNMP) defines a hierarchical tree of data, and one example of the same is shown in FIG. 1. More specifically, as shown in FIG. 1, three branches exist off a root node 100. These include a International Telegraph and Telephone Consultative Committee (CCITT, from French: Comité Consultatif International Téléphonique et Télégraphique ccitt(0) node 102, an international standards organization (iso(1)) node 104, and a node 106 that uses multiple standards (joint(2)). Structure of Management Information (SMI) network management private enterprise codes usually use the prefix: iso.org.dod.internet.private.enterprise (that is represented by the numerical string 1.3.6.1.4.1). Therefore, in FIG. 1, stemming from the international standards organization node 104 is a specific organization (org (3)) node 108. From node 108, a department of defense department of defense (dod(6)) node 110 branches, and from node 110, an Internet (Internet(1)) node 112 branches. From the Internet node 112, various nodes such as directory (directory(1)) node 114; management (mgmt(2)) node 116; experimental (experimental(3)) node 118; and private (private(4)) node 120.

Many branches in the hierarchical tree are defined by the Internet Requests for Comments (RFC) standards such as the printer Management Information Base (MIB). But companies also need to extend what is defined by the standards to provide richer or extended information. SNMP allows for private branches (often referred to as a sub-hierarchy or manufacturer arc) in the tree that is controlled by individual companies rather than a standards committee. Thus, FIG. 1 shows the branch numbered 1.3.6.1.4, which is the top of the branch under which companies can define their own sub-hierarchy. The path traceable to the private node 120 in FIG. 1 is called the "arc" of the object identifier (OID).

All information under this arc is controlled by a specific company, and is sometimes referred to as a manufacturer arc, a subtree, or private arc. Therefore, any additions (represented by "x") to the foregoing string of numbers 1.3.6.1.4.x.x.x is controlled by a specific company, and "x.x.x" is the manufacturer arc. This allows that company to provide extended data under the top arc, using their manufacturer arc. The company provides this information since no RFC defines a customer asset number field. Many network management tools identify a device's manufacturer, and then search only under that manufacturer's private arc for additional data.

In one specific example, various fields could be identified. One such arc field could be the system description ("sysDescr") which is a textual description of the entity. The sysDescr value can include the full name and version identification of the system's hardware type, software operating-system, and networking software. Another such arc field is the system object identification ("sysObjectID") which is the vendor's authoritative identification of the network management subsystem contained in the entity. The sysObjectID value is allocated within the SMI enterprises subtree (1.3.6.1.4.1) and provides an easy and unambiguous means for determining 'what kind of device is being managed. For example, if vendor 'Flintstones, Inc.' was assigned the SMI subtree identifier 1.3.6.1.4.1.4242, it could assign the identifier 1.3.6.1.4.1.4242.1.1 to its 'Fred Router'." Another such field is the device-type description ("hrDeviceDescr") which can be a textual description of the device, including the device's manufacturer and revision, and optionally, its serial number.

Most network management tools use such arc fields to identify network devices so as to manage these devices. For example for one particular device the above three fields indicates a fictitiously named "first entity" device as follows:

sysDescr.0="first entity Phaser 3150 B;OS 7.04 08-04-2005, NIC V1.02(3150);SN VDW801512 . . . "

sysObjectID.0=1.3.6.1.4.1.253.8.62.1.19.1.3.2 hrDeviceDescr.1="first entity Phaser 3450"

The systems and methods herein provide detection techniques made up of filtering and ranking of data to automatically determine the OEM of a network device using such information.

Figure 2:
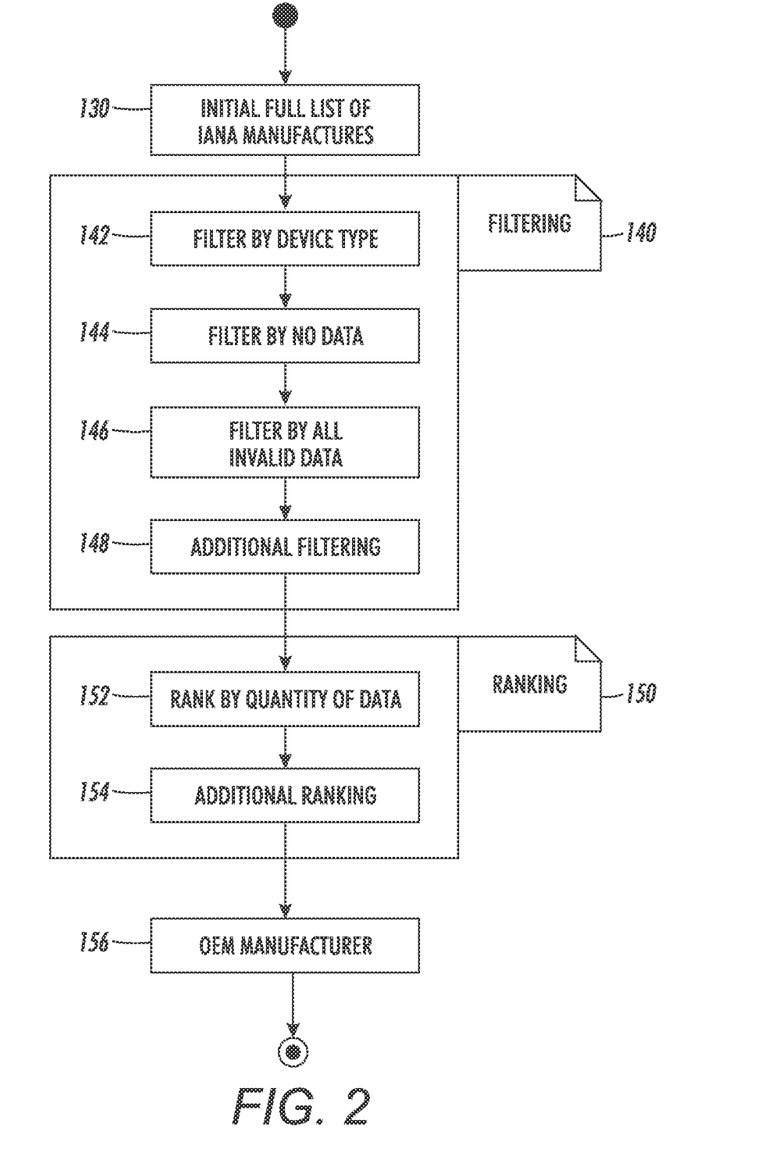
FIG. 2 is flow diagram illustrating features of embodiments herein.

For example, as shown in FIG. 2, the filtered data used by the systems and methods herein can start with the total list of IANA enterprise numbers ($\alpha$), as shown by item 130. The filtering is performed in item 140, and can include various filters, such as a key manufacturers device type filter ($\beta$) 142; a "no data" in the manufacturer arc type filter ($\gamma$) 144; an "all invalid data" in the manufacturer arc type filter ($\delta$) 146; and additional filtering 148. The ranking/matching process is shown in item 150, and can include ranking based on the quantity of data in the manufacturer arc ($\epsilon$) 152 and additional ranking 154, such as ranking by serial number formatting ($\zeta$);

a mobile access control (MAC) address formatting (η); a hypertext markup language (HTML) data references a manufacturer (θ); etc.

Below is an example of an OEM detection scenario for a printer device. With respect to the total list of Internet Assigned Numbers Authority (IANA) enterprise numbers is (α), item 130 in FIG. 2, the IANA defines approximately 29,000 private SNMP arcs. In item 142 in FIG. 2, regarding the key manufacturers of device type filter. (β), all private IANA numbers are filtered down to a static list of key manufacturers for the type of device data being searched for. In this scenario, the network management tool would be searching for printers and would only consider key printer manufacturer's IANA numbers, of which there are 49. Therefore, as a key manufacturer device type filter 142 (β) would be the list of 49, which is the list of 29,000 filtered by key manufacturer types. These 49 printer manufacturers are the OEM for almost all the printers in the world.

TABLE 1

| FIRST ENTITY | 253 |
| SECOND ENTITY | 236 |
| THIRD ENTITY | 258 |
| FOURTH ENTITY | 279 |
| FIFTH ENTITY | 294 |
| SIXTH ENTITY | 297 |
| SEVENTH ENTITY | 308 |
| EIGHTH ENTITY | 311 |
| NINETH ENTITY | 314 |
| TENTH ENTITY | 343 |
| ELEVENTH ENTITY | 367 |
| TWELTH ENTITY | 368 |
| THIRTEENTH ENTITY | 480 |
| FOURTEENTH ENTITY | 641 |
| FIFTEENTH ENTITY | 674 |
| SIXTEENTH ENTITY | 683 |
| SEVENTEENTH ENTITY | 835 |
| EIGHTEENTH ENTITY | 901 |
| NINETEENTH ENTITY | 902 |

As mentioned above, in item 144, the systems and methods herein filter based on whether there is data present in the manufacturer arc filter (γ). Here, the network management tool dynamically queries the device via the SNMP protocol. This can determine whether there is any manufacturer data under any private SNMP arc. For example, arbitrarily named "first entity" and "second entity" manufacturer arcs are queried and many items of data are found under the first entity and the second entity manufacturer arc.

All other manufacturers are eliminated due to no data being found under their private arcs. Arbitrary object identifiers could be:

oid=1.3.6.1.4.1.236.11.5.1.1.1.1.0 (where the "236" indicates the manufacturer is the "second entity"); and oid=1.3.6.1.4.1.253.8.51.1.2.1.1.1 0 (where the "253" indicates the manufacturer is the "first entity").

Here, "no data" in the manufacturer arc type filter (γ) 144 produces a list of 2. In other words, the above two object identifiers contain "236" and "253" in the private node 120, and therefore have "data" and are not filtered out in item 144.

As mentioned above, in some instances, there can be an "all invalid data" occurrence in the manufacturer arc filter (δ) as shown in item 146. The network management tool dynamically queries all data in each manufacturer arc. This querying technique returns data as well as the data type. Invalid data is inferred by default values for the data type in item 146.

For example, integers=0 and strings being null or empty represents invalid data. For example, two private manufacturer arcs could be queried and the following would indicate valid data for both manufacturers.

xcmGenOptionValueString (1.3.6.1.4.1.253.8.51.10.2.1.7)="XRX001599067F59"; and

SEC-prnSerialNo (1.3.6.1.4.1.236.11.5.1.1.1.4)= "VDW801512 . . . ".

Here, the "all invalid data" occurrences in the manufacturer arc filter (δ) produces a list of 2. In other words, the above two object identifiers contain valid data (specifically "236" and "253" respectively) in the private node 120. Since these data portions ("236" and "253") are included within the above-filtered 49 printer manufacturers, and therefore these object identifiers have "valid data" and are not filtered out in item 146.

With respect to item 152, where the quantity of data in the manufacturer arc ranking (ε) is performed, the network management tool counts the dynamically queried data in each manufacturer arc by counting the number of data items in the manufacturer arc's hierarchical levels (and tables contained therein). Each manufacturer will develop additional hierarchical relationships in the own manufacturer arc. Over time, these manufacturer arcs become more sophisticated and can include more levels, more table, etc. A manufacturer arc with a relatively smaller amount of data (lower count) is more likely to be an older manufacture arc, and is not likely to identify the OEM. Thus, a higher data count in the manufacturer arc implies that the manufacturer arc is newer and is more likely to identify the true OEM. Therefore, the systems and methods herein provide a higher ranking for the OEM manufacturer identified in manufacturer arc with the higher data count. In this scenario, the above two private manufacturer arcs are counted and ranked. The first entity arc has 263 items of data (represented within the "8.51.10.2.1.7" portion of the object identifier following "253") and the second entity arc has 658 items of data (represented within the "11.5.1.1.1.4" portion of the object identifier following "236"). In item 152, when ranking by the quantity of data in the manufacturer arc (ε), the second entity is greater than the first entity.

One of the additional ranking/matching processes that could be included in item 154 includes media access control (MAC) (η) matching. MAC addresses can be retrieved from a network device and can help identity the OEM manufacturer of the device 156. The MAC address has an organizationally unique identifier (OUI) that is a 24-bit number that is purchased from the Institute of Electrical and Electronics Engineers, Incorporated (IEEE) Registration Authority.

An example for a device where the SNMP MAC address can be retrieved from the RFC OID location is 1.3.6.12.1.2.2.1.6=001599067F59. There are tools and services to provide a lookup of a MAC address to a manufacturer. Therefore, by interpreting the MAC address, the OEM can be identified.

Another of the additional ranking/matching processes that could be included in item 154 includes the serial number format (ζ) matching. Most OEM manufacturers have a strict formatting of their serial numbers and do not change them when reselling their devices for different brands. The following is a small table of data that can provide OEM information from a serial number format.

TABLE 2

| OEM ID | OEM Name | serialNumber |
| --- | --- | --- |
| 253 | FIRST ENTITY | CNBC4C515F |
| 236 | SECOND ENTITY | VDW801512 . . . |

TABLE 2-continued

| OEM ID | OEM Name | serialNumber |
|---|---|---|
| 258 | THIRD ENTITY | 35P0NVR |
| 279 | FOURTH ENTITY | 1SNZDG1 |
| 294 | FIFTH ENTITY | D9J439025 |

In the example for the device that has a serial number=VDW801512 above, that format matches the second entity OEM. Therefore, by interpreting the serial number format, the OEM can be identified.

Another of the additional ranking/matching processes that could be included in item 154 includes identifying an OEM when the hypertext markup language (HTML) data references a manufacturer ($\theta$). The web pages of many printers are often quite complex and have information embedded that references the OEM manufacturer. Since this information is provided over HTML, the systems and methods herein scan for these references to identify the OEM. In the following example, all HTML data matches the brand manufacturer of first entity so this device has no HTML references to OEM data. The following is an example of possible html data from a different device to show how OEM data could be found:
<!DOCTYPE HTML PUBLIC "-//W3C//DTD HTML 4.01 Frameset//EN"><!—Copyright (c) 2000-2003, Fifth Co., Ltd. All Rights Reserved.—>

In this example, the following calculation determines that second entity is the OEM for this particular device:

($\alpha$)=list of 29,000 manufacturers (item 130, FIG. 2);

($\beta$)=list of 49 key printer manufacturers (item 142, FIG. 2);

($\gamma$)=list of 2 manufacturers with data (item 144, FIG. 2);

($\delta$)=list of 2 manufacturers with valid data (item 146, FIG. 2);

($\epsilon$)=Ordering by quantity=second entity>first entity (item 152, FIG. 2);

($\eta$)=MAC address formatting=second entity (item 154, FIG. 2);

($\zeta$)=Serial Number Formatting=second entity (item 154, FIG. 2); and ($\theta$)=Html data reference=No OEM data (item 154, FIG. 2).

With respect to OEM detection, the OEM determination can be expressed as a query. In cases where there is no data available or null, that data is ignored and does not affect the results. The example query could be expresses as: from $\beta$ where exists in $\gamma$ and exists in $\delta$ order by $\epsilon$ then by $\eta$ then by $\zeta$ then by $\theta$.

As mentioned above, lack of quality device data is one of the major problems in network device management. The systems and methods herein increase the quantity and quality of data for remote management. Thus, the methods and systems herein provide improved data, and reduce costs or add value in the following areas: accurate replenishment of compatible supplies; reduced "break-fix" support; assist in securing devices; assist in contract agreements; etc.

Thus, the additional information produced by the systems and methods herein provide manufactures the capability of obtaining more accurate information about supplies information. This allows manufacturers to offer compatible supplies replenishment for a wider number of devices, which can decrease cost. Also shipments of supplies are delivered more accurately to customers, which will build customer confidence.

Another feature of systems and methods herein is a reduction in "break fix" cost. With additional data the systems and methods herein provide more accurate information on the state of the device. For example, the systems and methods herein provide a manufacturer the ability to register for OEM traps to receive messages on the state of the device remotely. The ability to diagnose the state of device before deciding to send an on-site technician reduces support costs.

Further, the systems and methods herein secure devices by reducing security risks. When devices are shipped, some OEM's leave unnecessary ports open. This is a security risk to the customer. Having the OEM data allows systems and methods herein to lock such open communication ports, which is beneficial in locking down devices and such increased security builds customer confidence. Thus, the systems and methods herein collect quality data from it devices, and add value in contract agreement that leads to profitable contracts. This provides drastic cost savings and added customer confidence.

Therefore, the systems and methods herein provide device management solutions to determine if an OEM programmatic interface other than the brand manufacturer's is present, and if multiple interfaces are available, how to rank which one to use. Knowledge of the OEM manufacturer allows for better management of such devices since the OEM Manufacturer's programmatic interface often contains great capabilities, is more complete, and contains more accurate data. This results in better remote management, reduced service costs, reduced parts inventories, and the ability to provide compatible supplies replenishment.

Figure 3:
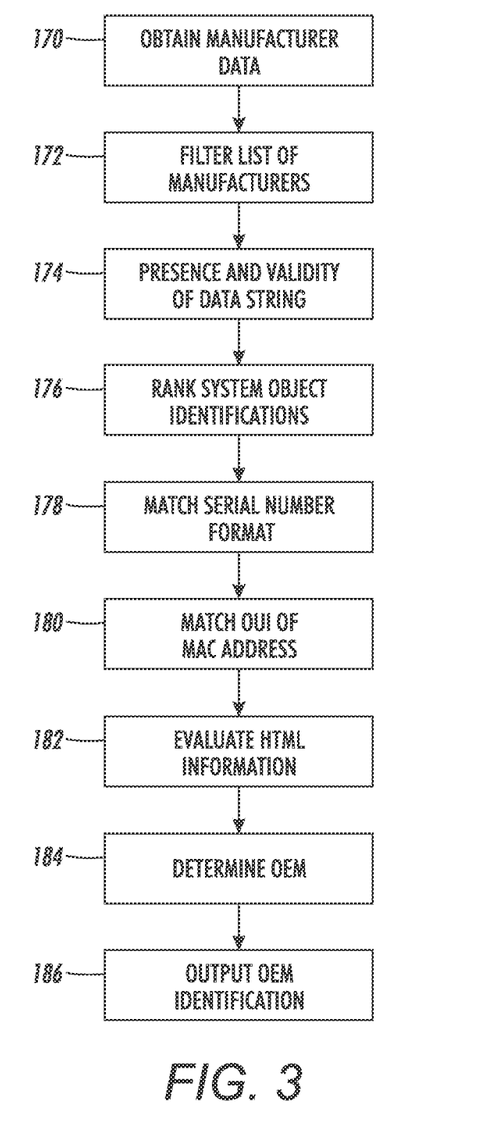
FIG. 3 is flow diagram illustrating features of embodiments herein.

FIG. 3 is flowchart illustrating an exemplary method herein. In item 170, this exemplary method obtains, using a communications device, manufacturer data from an evaluated device by, for example, dynamically querying the evaluated device via a simple network management protocol (SNMP).

There may be multiple manufacturer data items indicating different manufacturers of the evaluated device (only one of which can be the original equipment manufacturer) especially if the seller has obtained the evaluated device from another manufacturer, and has rebranded the evaluated device. As used herein the term "device" can comprise any form of device, from a minor component, to an entire device. Therefore, the "device" that is queried, could just be the processor or printing engine (or even toner cartridge), or the device could be the entire multi-function printing device.

Further, while manufacturers often use components manufactured by others, depending upon the item that is defined as the "device" there can be only one OEM for any given device. For example, if the evaluated device is a microprocessor chip, the OEM is the manufacturer that performed the final assembly on the chip, despite the chip containing memories and a processor from a different supplier manufacturer. Similarly, the OEM of a printing device is the manufacturer that performed the final assembly on the printing device, despite the printing device containing a microprocessor chip from a different supplier manufacturer.

Again, the manufacturer data obtained in item 170 can include many data items, some of which include a system description, a system object identification, a device-type description, hypertext markup language (HTML) information, a media access control (MAC) address having an organizationally unique identifier (OUI), etc. The system description can include a serial number having a format, and the system object identification can include a standards manufacturer field established by a standards organization (maintaining, for example, manufacturer's IANA numbers).

In item 172, this method filters a list of manufacturers established by the standards organization to produce a filtered manufacturer list containing only those manufacturers matching the device-type description (as shown in Table 1, above). Then, in item 174, this exemplary method also evaluates the standards manufacturer field to identify the presence of a data string (representing, for example, manufacturer's IANA numbers, etc.), and the validity of any such data string by comparing the data string in the standards manufacturer field with the filtered manufacturer list (again using the processor).

This method then ranks multiple system object identifications that may appear in the manufacturer data in item 176 based on the quantity of data within each system object identification to produce a rank value for each system object identification (using the processor). The quantity of data within each system object identification is based only on the manufacturer portion (arc) of the system object identification, where the manufacturer portion of the system object identification is uniquely associated with (developed or owned by) only one of a plurality of different manufacturers. As mentioned above, more hierarchical fields/tables in the unique manufacturer's portion indicates that such a system object identification is more likely to be a more recent system object identification and is, therefore, more likely to indicate the actual OEM. Therefore, in item 176, a higher quantity of hierarchical fields/tables in the unique manufacturer's portion gives a system object identification a higher rank, relative to other system object identifications with lower quantities of hierarchical fields/tables (data).

Further, in item 178, this method matches the format of the serial number to known manufacturer serial number formats to produce a manufacturer serial number format match. Similarly, in item 180, this exemplary matches the OUT of the MAC address to known manufacturer OUI's to produce a manufacturer OUT match. Further, in item 182, this method evaluates the HTML information to discover HTML manufacturer information (using the processor).

Thus, in item 184, this method can then determine the OEM of the evaluated device based on the presence and validity of the data string (174), the rank for each system object identification (176), the manufacturer appearing in the serial number format match (178), the manufacturer appearing in the manufacturer OUT match (180), and the manufacturer appearing in the HTML manufacturer information (182). Such OEM identification can then be output to the user, another device, an application, etc., in item 186.

Figure 4:
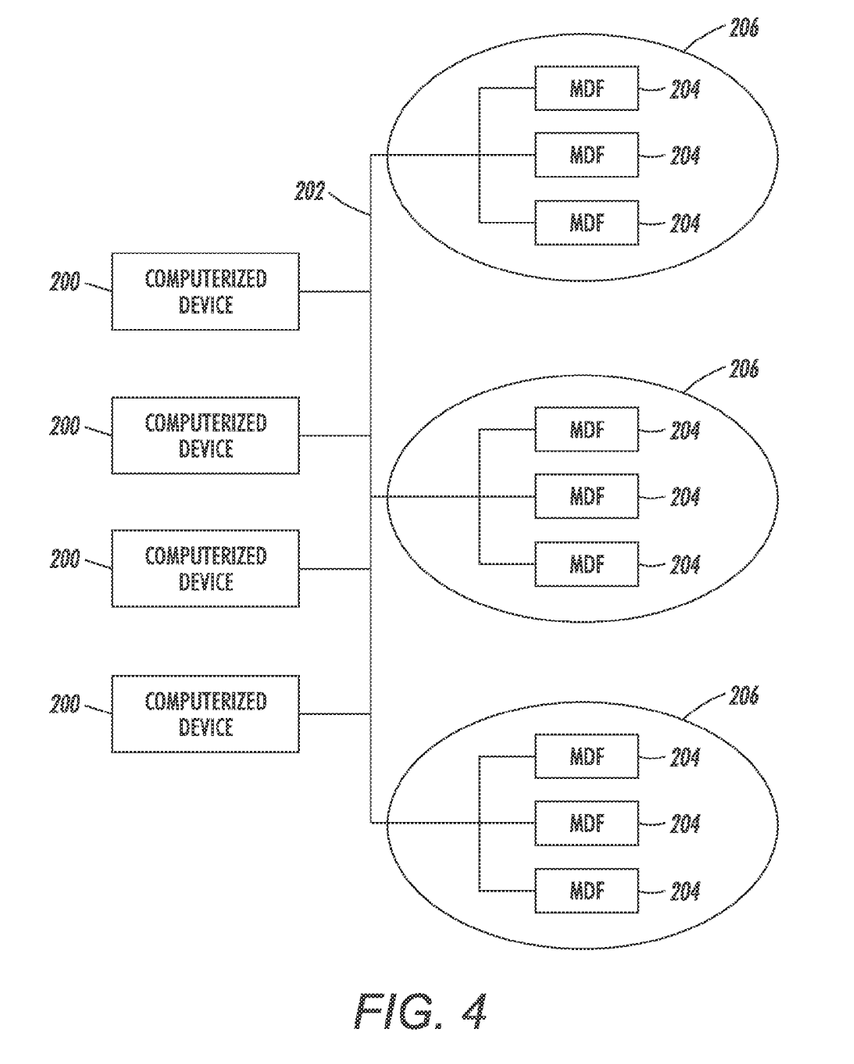
FIG. 4 is a block schematic diagram of a system according to embodiments herein.

As shown in FIG. 4, exemplary system embodiments herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 5:
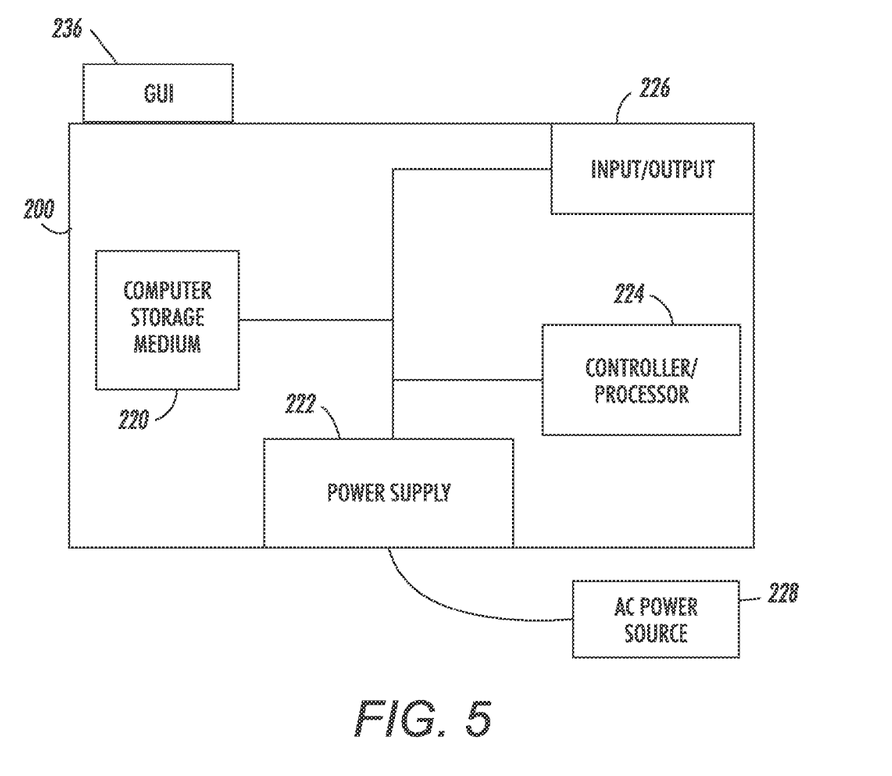
FIG. 5 is a block schematic diagram of a device according to embodiments herein.

FIG. 5 illustrates a computerized device 200, which can be used with embodiments herein and can comprise, for example, a print server, a personal computer, a portable computing device, etc. The computerized device 200 includes a controller/processor 224 and a communications port (input/output) 226 operatively connected to the processor 224 and to the computerized network 202 external to the computerized device 200. Also, the computerized device 200 can include at least one accessory functional component, such as a graphic user interface assembly 236 that also operate on the power supplied from the external power source 228 (through the power supply 222).

The input/output communications device 226 is used for communications to and from the computerized device 200. The processor 224 controls the various actions of the computerized device. A non-transitory computer storage medium device 220 (which can be optical, magnetic, capacitor based, etc.) is readable by the processor 224 and stores instructions that the processor 224 executes to allow the computerized device to perform its various functions, such as those described herein. Thus, as shown in FIG. 5, a body housing 200 has one or more functional components that operate on power supplied from the alternating current (AC) 228 by the power supply 222. The power supply 222 can comprise a power storage element (e.g., a battery) and connects to an external alternating current power source 228 and converts the external power into the type of power needed by the various components.

Figure 6:
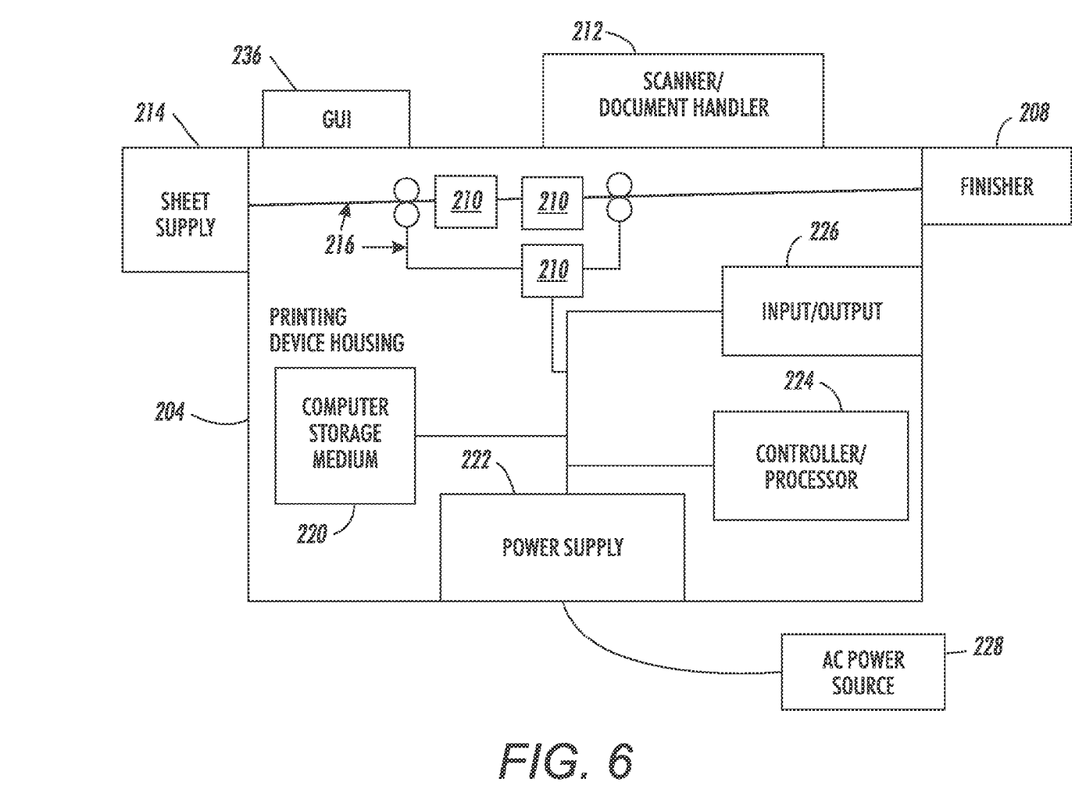
FIG. 6 is a block schematic diagram of a device according to embodiments herein.

FIG. 6 illustrates a computerized device that is a printing device 204, which can be used with embodiments herein and can comprise, for example, a printer, copier, multi-function machine, multi-function device (MFD), etc. The printing device 204 includes many of the components mentioned above and at least one marking device (printing engines) 210 operatively connected to the processor 224, a media path 216 positioned to supply sheets of media from a sheet supply 214 to the marking device(s) 210, etc. After receiving various markings from the printing engine(s), the sheets of media can optionally pass to a finisher 208 which can fold, staple, sort, etc., the various printed sheets. Also, the printing device 204 can include at least one accessory functional component (such as a scanner/document handler 212, etc.) that also operates on the power supplied from the external power source 228 (through the power supply 222).

The communications device 226 obtains manufacturer data from the evaluated device (which can be device 200 or 204, for example). Again, the manufacturer data can include a system description, a system object identification, and a device-type description. The system description similarly includes a serial number having a format, and the system object identification includes a standards manufacturer field established by a standards organization.

The processor 224 filters a list of manufacturers established by the standards organization stored in the non-transitory storage medium 220 to produce a filtered manufacturer list containing only those manufacturers matching the device-type description. The processor 224 evaluates the standards manufacturer field to determine the presence and validity of a data string by comparing the data string in the standards manufacturer field with the filtered manufacturer list.

The processor 224 also ranks multiple system object identifications based on the quantity of data within each system object identification to produce a rank for each system object identification. The processor 224 matches the format of the serial number to known manufacturer serial number formats stored in the non-transitory storage medium to produce a manufacturer serial number format match. Thus, the processor 224 determines the original equipment manufacturer (OEM) of the evaluated device based on the manufacturer appearing in the data string, the rank for each system object identification, and the manufacturer appearing in the serial number format match.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art and are discussed in, for example, U.S. Pat. Nos. 6,032,004, and 7,874,664 the complete disclosures of which are fully incorporated herein by reference. The embodiments herein can encompass embodiments that print in color, monochrome, or handle color or monochrome image data. All foregoing embodiments are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the embodiments herein cannot be implied or imported from any above example as limitations to any particular order, number, position, size, shape, angle, color, or material.

What is claimed is:

1. A method comprising:
    obtaining, using a communications device, manufacturer data from an evaluated device,
        said manufacturer data comprising a system description, a system object identification, and a device-type description,
        said system description including a serial number having a format, and
        said system object identification including a standards manufacturer field established by a standards organization;
    filtering a list of manufacturers established by said standards organization to produce a filtered manufacturer list containing only those manufacturers matching said device-type description using a processor operatively connected to said communications device;
    evaluating said standards manufacturer field to identify validity of a data string by comparing said data string in said standards manufacturer field with said filtered manufacturer list using said processor;
    ranking multiple ones of said system object identification based on a quantity of data within each said system object identification to produce a rank for each said system object identification using said processor, said quantity of data within each said system object identification being based only on a manufacturer portion of said system object identification;
    matching said format of said serial number to known manufacturer serial number formats to produce a manufacturer serial number format match using said processor; and
    determining an original equipment manufacturer (OEM) of said evaluated device based on said validity of said data string, said rank for each said system object identification, and said serial number format match using said processor.

2. The method according to claim 1, said determining of said OEM of said evaluated device being based on a manufacturer appearing in said data string, said rank for each said system object identification, and a manufacturer appearing in said serial number format match.

3. The method according to claim 1, said obtaining of said manufacturer data comprising dynamically querying said evaluated device via a simple network management protocol (SNMP).

4. The method according to claim 1, said standards manufacturer field comprising internet assigned numbers authority (IANA) enterprise numbers.

5. The method according to claim 1, said manufacturer portion of said system object identification being uniquely associated with only one of a plurality of different manufacturers.

6. The method according to claim 1, said manufacturer data from said evaluated device comprising multiple manufacturer data items indicating different manufacturers, only one of said different manufacturers being said OEM of said evaluated device.

7. A method comprising:
    obtaining, using a communications device, manufacturer data from an evaluated device,
        said manufacturer data comprising a system description, a system object identification, a device-type description, hypertext markup language (HTML) information, and a media access control (MAC) address having an organizationally unique identifier (OUI),
        said system description including a serial number having a format, and
        said system object identification including a standards manufacturer field established by a standards organization;
    filtering a list of manufacturers established by said standards organization to produce a filtered manufacturer list containing only those manufacturers matching said device-type description using a processor operatively connected to said communications device;
    evaluating said standards manufacturer field to identify presence of a data string using said processor;
    evaluating said standards manufacturer field to identify validity of said data string by comparing said data string in said standards manufacturer field with said filtered manufacturer list using said processor;
    ranking multiple ones of said system object identification based on a quantity of data within each said system object identification to produce a rank for each said system object identification using said processor;
    matching said format of said serial number to known manufacturer serial number formats to produce a manufacturer serial number format match using said processor;
    matching said OUI of said MAC address to known manufacturer OUI's to produce a manufacturer OUI match using said processor;

evaluating said HTML information to discover HTML manufacturer information using said processor; and determining an original equipment manufacturer (OEM) of said evaluated device based on said presence of said data string, said validity of said data string, said rank for each said system object identification, said serial number format match, said manufacturer OUI match, and said HTML manufacturer information using said processor.

8. The method according to claim 7, said determining of said OEM of said evaluated device being based on said presence of said data string, said validity of said data string, said rank for each said system object identification, a manufacturer appearing in said serial number format match, a manufacturer appearing in said manufacturer OUI match, and a manufacturer appearing in said HTML manufacturer information.

9. The method according to claim 7, said obtaining of said manufacturer data comprising dynamically querying said evaluated device via a simple network management protocol (SNMP).

10. The method according to claim 7, said standards manufacturer field comprising internet assigned numbers authority (IANA) enterprise numbers.

11. The method according to claim 7, said quantity of data within each said system object identification being based only on a manufacturer portion of said system object identification, said manufacturer portion of said system object identification being uniquely associated with only one of a plurality of different manufacturers.

12. The method according to claim 7, said manufacturer data from said evaluated device comprising multiple manufacturer data items indicating different manufacturers, only one of said different manufacturers being said OEM of said evaluated device.

13. A computerized device comprising:
a processor;
a non-transitory storage medium operatively connected to said processor; and
a communications device operatively connected to said processor,
said communications device obtaining manufacturer data from an evaluated device,
said manufacturer data comprising a system description, a system object identification, a device-type description,
said system description including a serial number having a format, and
said system object identification including a standards manufacturer field established by a standards organization,
said processor filtering a list of manufacturers established by said standards organization stored in said non-transitory storage medium to produce a filtered manufacturer list containing only those manufacturers matching said device-type description,
said processor evaluating said standards manufacturer field to identify validity of a data string by comparing said data string in said standards manufacturer field with said filtered manufacturer list;
said processor ranking multiple ones of said system object identification based on a quantity of data within each said system object identification to produce a rank for each said system object identification, said quantity of data within each said system object identification being based only on a manufacturer portion of said system object identification;

said processor matching said format of said serial number to known manufacturer serial number formats stored in said non-transitory storage medium to produce a manufacturer serial number format match; and said processor determining an original equipment manufacturer (OEM) of said evaluated device based on said validity of said data string, said rank for each said system object identification, and said serial number format match.

14. The computerized device according to claim 13, said determining of said OEM of said evaluated device being based on a manufacturer appearing in said data string, said rank for each said system object identification, and a manufacturer appearing in said serial number format match.

15. The computerized device according to claim 13, said obtaining of said manufacturer data comprising said communications device dynamically querying said evaluated device via a simple network management protocol (SNMP).

16. The computerized device according to claim 13, said standards manufacturer field comprising internet assigned numbers authority (IANA) enterprise numbers.

17. The computerized device according to claim 13, said manufacturer portion of said system object identification being uniquely associated with only one of a plurality of different manufacturers.

18. The computerized device according to claim 13, said manufacturer data from said evaluated device comprising multiple manufacturer data items indicating different manufacturers, only one of said different manufacturers being said OEM of said evaluated device.

19. A non-transitory storage medium readable by a computerized device, said non-transitory storage medium storing instructions causing said computerized device to perform a method comprising:
obtaining manufacturer data from an evaluated device,
said manufacturer data comprising a system description, a system object identification, a device-type description,
said system description including a serial number having a format, and
said system object identification including a standards manufacturer field established by a standards organization;
filtering a list of manufacturers established by said standards organization to produce a filtered manufacturer list containing only those manufacturers matching said device-type description;
evaluating said standards manufacturer field to identify validity of a data string by comparing said data string in said standards manufacturer field with said filtered manufacturer list;
ranking multiple ones of said system object identification based on a quantity of data within each said system object identification to produce a rank for each said system object identification, said quantity of data within each said system object identification being based only on a manufacturer portion of said system object identification;
matching said format of said serial number to known manufacturer serial number formats to produce a manufacturer serial number format match; and
determining an original equipment manufacturer (OEM) of said evaluated device based on said validity of said data string, said rank for each said system object identification, and said serial number format match.

20. The non-transitory storage medium according to claim 19, said determining of said OEM of said evaluated device being based on a manufacturer appearing in said data string, said rank for each said system object identification, and a manufacturer appearing in said serial number format match.

21. The non-transitory storage medium according to claim 19, said obtaining of said manufacturer data comprising dynamically querying said evaluated device via a simple network management protocol (SNMP).

22. The non-transitory storage medium according to claim 19, said standards manufacturer field comprising internet assigned numbers authority (IANA) enterprise numbers.

23. The non-transitory storage medium according to claim 19, said manufacturer portion of said system object identification being uniquely associated with only one of a plurality of different manufacturers.

24. The non-transitory storage medium according to claim 19, said manufacturer data from said evaluated device comprising multiple manufacturer data items indicating different manufacturers, only one of said different manufacturers being said OEM of said evaluated device.

\* \* \* \* \*